(12) United States Patent
Srivastava

(10) Patent No.: US 10,489,339 B2
(45) Date of Patent: *Nov. 26, 2019

(54) SENSOR BUS COMMUNICATION SYSTEM

(71) Applicant: Intel Corporation, Santa Clara, CA (US)

(72) Inventor: Amit Kumar Srivastava, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,977

(22) Filed: Jul. 20, 2018

(65) Prior Publication Data
US 2019/0138490 A1 May 9, 2019

Related U.S. Application Data

(63) Continuation of application No. 15/086,700, filed on Mar. 31, 2016, now Pat. No. 10,031,882.

(51) Int. Cl.
| G06F 13/42 | (2006.01) |
| G06F 13/364 | (2006.01) |
| G06F 13/16 | (2006.01) |
| G06F 1/32 | (2019.01) |
| G06F 1/324 | (2019.01) |

(52) U.S. Cl.
CPC .......... *G06F 13/4291* (2013.01); *G06F 1/324* (2013.01); *G06F 13/1673* (2013.01); *G06F 13/364* (2013.01)

(58) Field of Classification Search
None
See application file for complete search history.

(56) References Cited

U.S. PATENT DOCUMENTS

| 4,852,041 A | 7/1989 | Nakano |
| 2012/0059968 A1 | 3/2012 | Rofougaran |
| 2014/0075061 A1 | 3/2014 | Fritchman |
| 2014/0289434 A1 | 9/2014 | Ranganathan et al. |

(Continued)

FOREIGN PATENT DOCUMENTS

WO 2015167954 11/2015

OTHER PUBLICATIONS

International Preliminary Report on Patentability from PCT/US2017/019736 notified Oct. 11, 2018, 8 pgs.

(Continued)

*Primary Examiner* — Idriss N Alrobaye
*Assistant Examiner* — Dayton Lewis-Taylor
(74) *Attorney, Agent, or Firm* — Green, Howard & Mughal LLP

(57) ABSTRACT

Described is an I3C Repeater. The I3C Repeater may have a first circuitry with an I3C interface, a second circuitry with an I2C interface, and a datapath circuitry coupled to the first circuitry and the second circuitry. The second circuitry may be operable to convert a transaction received on the I2C interface into a transaction for the I3C interface, and to convert a transaction received on the I3C interface into a transaction for the I2C interface. The I3C Repeater may also have additional circuitries operable to convert transactions received on one of an SPI interface, a UART interface, and a Debug bus interface into transactions for the I3C interface, and vice-versa.

22 Claims, 8 Drawing Sheets

(56) References Cited

U.S. PATENT DOCUMENTS

2015/0100713 A1    4/2015  Sengoku
2015/0370735 A1   12/2015  Pitigoi-Aron

OTHER PUBLICATIONS

International Search Report and Written Opinion for International Patent Application No. PCT/US2017/019736, dated May 24, 2017.
Non-Final Office Action for U.S. Appl. No. 15/086,700, dated Nov. 3, 2017.
Notice of Allowance for U.S. Appl. No. 15/086,700, dated Apr. 5, 2018.

SENSOR BUS COMMUNICATION SYSTEM

CLAIM OF PRIORITY

The present application is a continuation of U.S. patent application Ser. No. 15/086,700, filed Mar. 31, 2016, titled "SENSOR BUS COMMUNICATION SYSTEM", which is incorporated herein by reference in its entirety for all purposes.

BACKGROUND

A wide variety of components may include Inter-Integrated Circuit (I2C) interfaces to connect the components to a board-based serial data bus, where the I2C interface is defined by the I2C-bus Specification, Version 6.0, Published 4 Apr. 2014. I2C interfaces may provide a low-speed, side-band mechanism for facilitating chip-to-chip communication and various operations. For example, I2C interfaces may facilitate communication with sensor or camera components and their configuration operations.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Some sensors, such as sensors for always-on imaging or always-on sensing, may require high data throughput. An Improved Inter-Integrated Circuit (I3C) interface is targeted to deliver much higher throughput for communication between sensor devices and a host device, and for camera interface communication. The I3C interface is also targeted to support legacy devices incorporating I2C interfaces. I3C interfaces may have an operating frequency of approximately 12.9 MHz max, in comparison with an I2C Fast-mode plus (Fm+) operating frequency of approximately 1.0 MHz max.

I3C support for legacy devices incorporating I2C interfaces (as well as I3C support for other mixed-speed interfaces) faces various challenges. To begin with, I3C devices using an I3C interface will need to communicate at the 12.9 MHz max I3C operating frequency, but bus speeds may be limited by I2C devices, which will reduce bus efficiency. Similarly, many I2C devices (such as sensor devices) may be designed for operating voltages of 5.0 V, 3.3 V, 1.8 V, or 1.2 V (or lower voltages in the future) and may require interconnected I3C devices (whether master or slave) to support signaling at voltages of 5.0 V, 3.3 V, 1.8 V, 1.2V, or a lower voltage in order to prevent current flow from a higher-voltage I2C device to a lower-voltage I3C device.

In addition, while the I3C specification may permit the use of a common bus for both I3C and I2C components, some components (such as some sensing devices) may be limited to using an I3C-only bus, or an I2C-only bus. Finally, the idle states for both I2C busses and I3C busses may require lines pulled to high voltages. Pulling a bus line on a lower-voltage interface to a higher voltage while in the idle state may overstress I3C-compatible low-voltage devices (whether master or slave), such as lower-voltage I3C drivers, and may impose reliability aging and overstress, which may degrade product life cycle.

Figure 1:
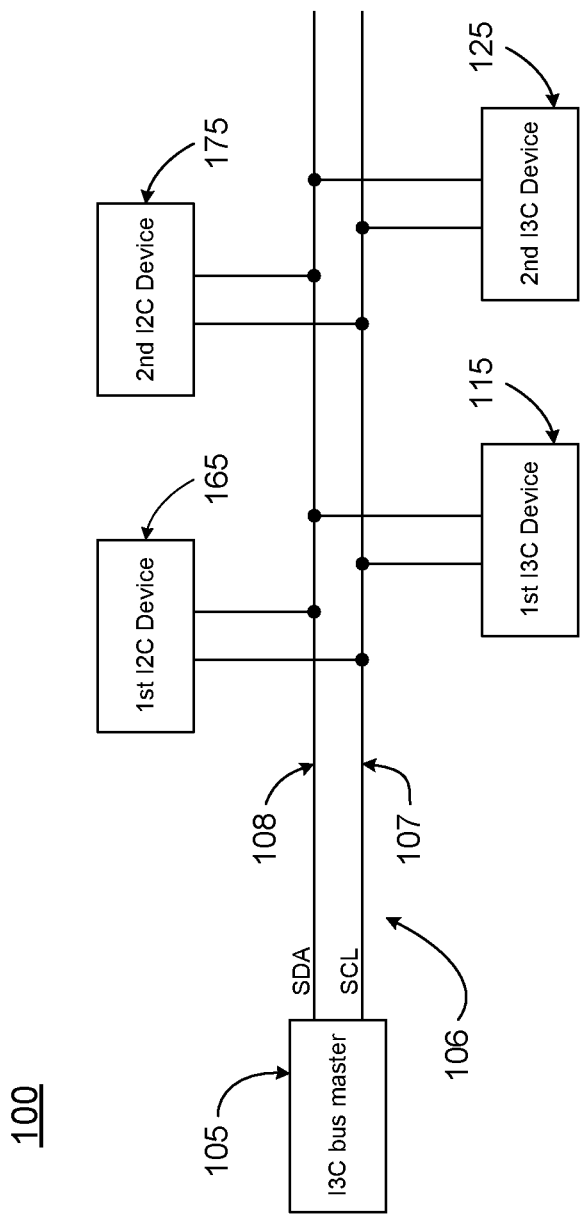
FIG. 1 illustrates high-level Inter-Integrated Circuit (I2C) bus and Improved Inter-Integrated Circuit (I3C) bus connectivity supported by I3C, according to some embodiments of the disclosure.

FIG. 1 illustrates a high-level I2C and I3C bus connectivity supported by I3C, according to some embodiments of the disclosure. In some embodiments, system 100 may include an I3C bus 106 having an I3C clock signal path 107 and an I3C data signal path 108. I3C bus 106 may be a serial data bus, and I3C clock signal path 107 (which may also transmit data in a different speed or mode) and I3C data signal path 108 may be exercised to transmit data serially on I3C bus 106. System 100 may include an I3C master 105, a first I3C device 115, and a second I3C device 125, which may have serial-clock and serial-data ports coupled to I3C clock signal path 107 and I3C data signal path 108, respectively.

In addition, system 100 may include two I2C devices: a first I2C device 165, and a second I2C device 175. These I2C devices may also have serial-clock and serial-data ports coupled to I3C clock signal path 107 and I3C data signal path 108, respectively. Accordingly, I3C bus 106 may be coupled to I3C master 105, first I3C device 115, second I3C device 125, first I2C device 165, and second I2C device 175.

As discussed above, support for I2C devices (such as first I2C device 165 and second I2C device 175) on an I3C bus may present a variety of challenges, such as challenges related to operating frequencies and operating voltages within the system. An alternative bus architecture is presented below to address and resolve these challenges. In comparison with the bus architecture of FIG. 1, the alternative bus architecture may isolate low speed busses from high speed busses, may isolate high voltage busses from low voltage busses, and may facilitate bus speed translation. In addition, the alternative bus architecture may provide support for guest protocols (such as Serial Peripheral Interface Bus (SPI), Universal Asynchronous Receiver/Transmitter (UART), and Debug bus) by enabling inter-protocol conversions (e.g. SPI-I3C conversion and UART-I3C conversion).

More particularly, the alternative bus architecture is based upon an I3C Repeater. The I3C Repeater may have an internal clock source, and may accordingly not depend upon a clock source from a master device. The I3C Repeater may isolate a higher-speed, lower-voltage I3C bus from a lower-speed, higher-voltage I2C bus, and may convert and forward transactions (and corresponding data packets) between an I3C bus and an I2C bus. In addition to performing I2C-I3C conversion, the I3C Repeater may also convert and forward transactions between an I3C bus and one or more "guest"

busses, such as an SPI or UART bus, and may thus perform SPI-I3C conversion and/or UART-I3C conversion.

The disclosed I3C Repeaters may advantageously isolate high voltage and low voltage busses to smooth integration of legacy devices in mixed-voltage systems, improve bus speed and efficiency, improve power consumption, and support legacy operating frequencies without impacting bus speed. Meanwhile, the disclosed I3C Repeaters may also advantageously support guest protocols such as SPI, UART, and debug mode, and provide for scalability of the bus architecture to future protocols.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Figure 2:
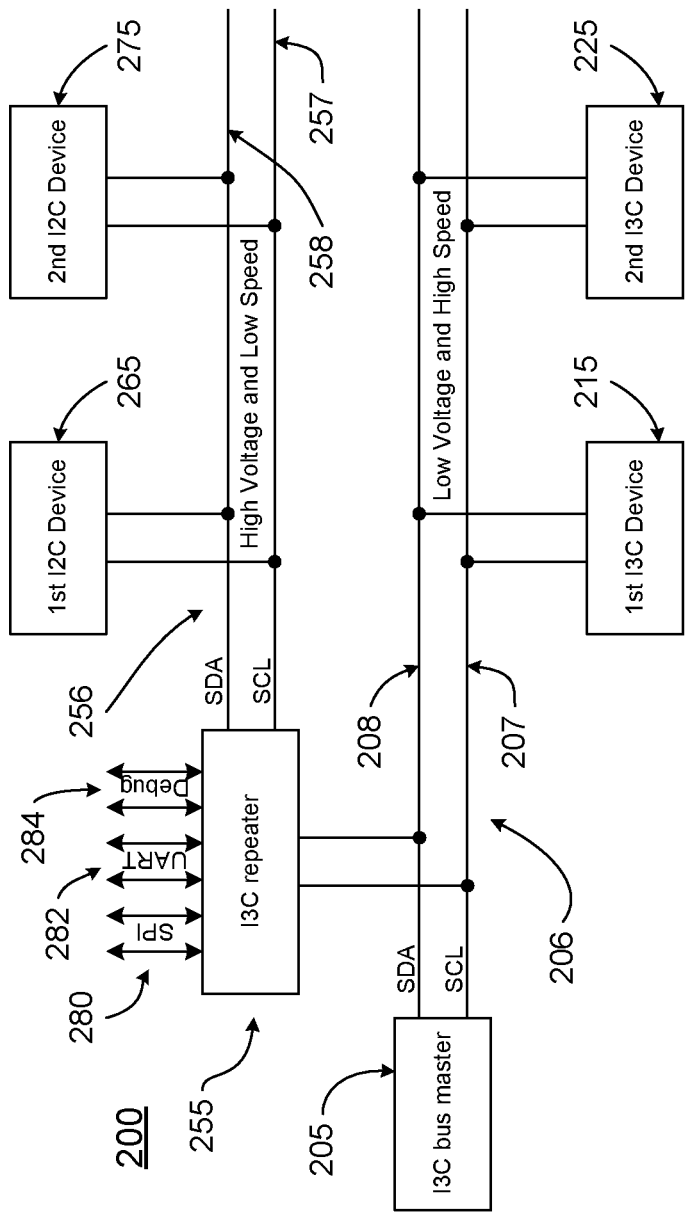
FIG. 2 illustrates an I3C system bus incorporating an I3C Repeater, according to some embodiments of the disclosure.

FIG. 2 illustrates -an I3C system bus incorporating an I3C Repeater, according to some embodiments of the disclosure. In FIG. 2, system 200 may include an I3C bus 206 having an I3C clock signal path 207 (which may also transmit data in a different speed or mode) and an I3C data signal path 208. I3C bus 206 may be a serial data bus, and I3C clock signal path 207 and I3C data signal path 208 may be exercised to transmit data serially on I3C bus 206. System 200 may include an I3C master 205, a first I3C device 215, and a second I3C device 225, which may have serial-clock and serial-data ports coupled to I3C clock signal path 207 and I3C data signal path 208, respectively. More generally, system 200 may include any number of I3C-compliant devices coupled to I3C bus 206.

As with system 100, system 200 may include one or more I2C-compliant devices, such as first I2C device 265 and second I2C device 275. However, in contrast with system 100, system 200 may include an I3C repeater 255, which may be coupled both to I3C bus 206 and an I2C bus 256. In turn, I2C bus 256 may have an I2C clock signal path 257 and an I2C data signal path 258 that may be exercised to transmit data serially on I2C bus 256. As with I3C master 205, first I3C device 215, and second I3C device 225, I3C repeater 255 may have serial-clock and serial-data ports coupled to I3C clock signal path 207 and I3C data signal path 208, respectively. In addition, I3C repeater 255, first I2C device 265, and second I2C device 275 may have serial-clock and serial-data ports connected to I2C clock signal path 257 and I2C data signal path 258, respectively.

In some embodiments, I3C bus 206 may be coupled to I3C master 205, I3C repeater 255, first I3C device 215, and second I3C device 225, while I2C bus 256 may be coupled to I3C repeater 255, first I2C device 265, and second I2C device 275. I3C repeater 255 may accordingly interact with I3C devices (e.g. I3C master 205) over I3C bus 206, and may also interact through I3C repeater 255 with I2C devices over I2C bus 256.

I3C repeater 255 may thus separate I3C-based devices from I2C-based devices, thereby isolating devices operating at different frequencies voltages. In some embodiments, I3C bus 206 may operate at a first operating frequency and a first operating voltage, while I2C bus 256 may operate at a second operating frequency and a second operating voltage. The first operating frequency may be greater than the second operating frequency, and the first operating voltage may be less than the second operating voltage.

For example, the first operating frequency may be approximately 12.9 MHz, max while the second operating frequency may be approximately 1.0 MHz max (e.g., a frequency associated with Fm+ I2C operation). In some embodiments, the second operating frequency may be another frequency, such as a frequency associated with low-speed mode I2C operation (e.g. approximately 10 kHz max), or a frequency associated with standard mode I2C operation (e.g. approximately 100 kHz max), or a frequency associated with Fast-mode (Fm) or full speed I2C operation (e.g. approximately 400 kHz max), or a frequency associated with High-speed mode (Hs) I2C operation (e.g. approximately 3.4 MHz max), or a frequency associated with Ultra Fast-mode (UFm) I2C operation (e.g. approximately 5.0 MHz max). With respect to voltages, the second operating voltage may be 5.0 V, 3.3 V, 1.8 V, or 1.2 V, and the first operating voltage may be lower than the second operating voltage.

I3C repeater 255 may also support guest protocols such as SPI, UART, and/or Debug interfaces. Accordingly, I3C repeater 255 is depicted in FIG. 2 as including an SPI interface 280, a UART interface 282, and a Debug bus interface 284. The various interfaces of I3C repeater 255 may be used to facilitate interaction between I3C devices, I2C devices, SPI devices, UART devices, and/or Debug bus devices. Separating the various busses may help improve bus efficiency, and may help avoid electrostatic overstress and aging degradation conditions for low-voltage devices supporting I3C. Although I3C repeater 255 is depicted as including SPI interface 280, UART interface 282, and Debug bus interface 284, these are exemplary interfaces, and I3C repeater 255 may support other interfaces without departing from the scope of the present disclosure.

Figure 3:
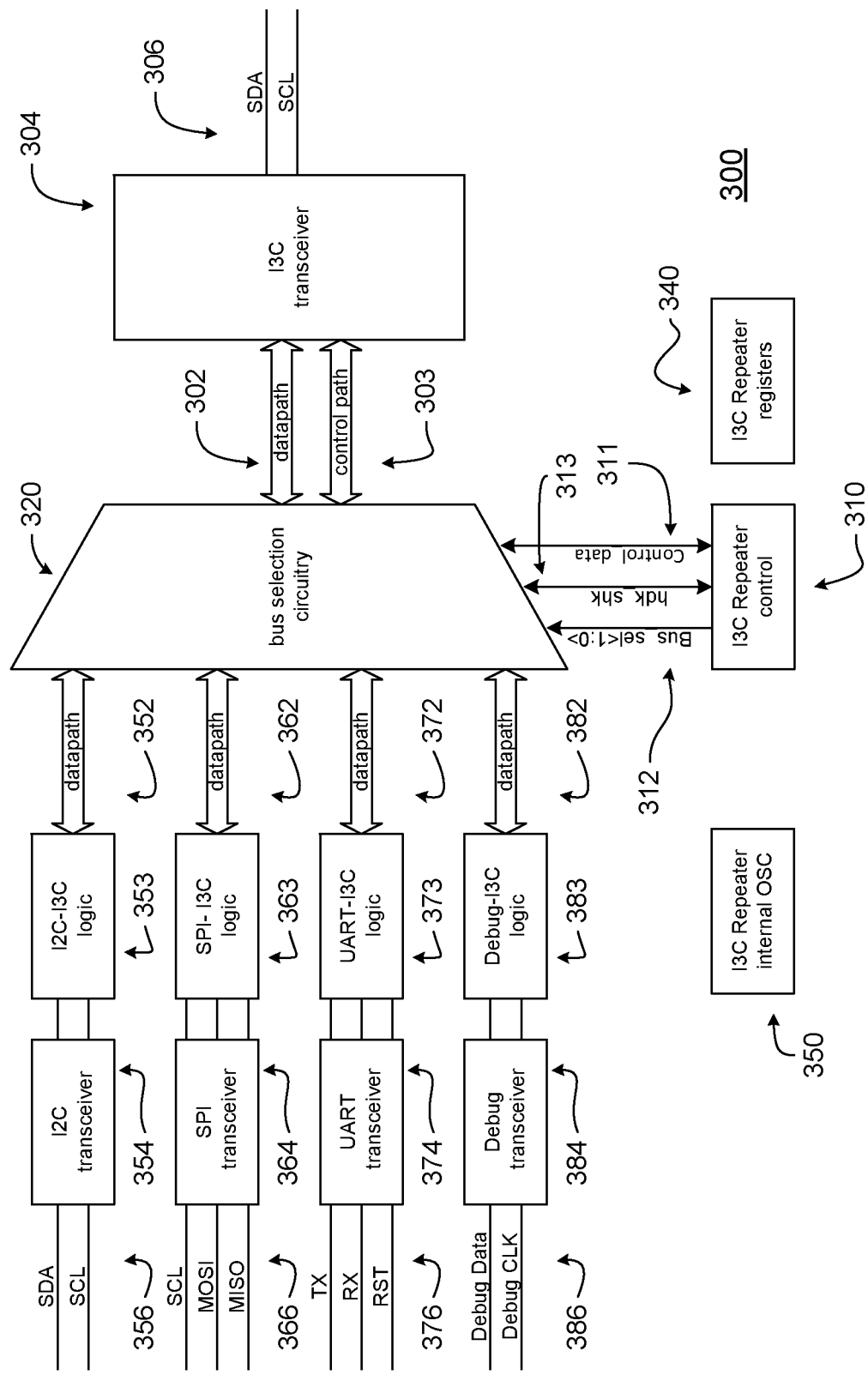
FIG. 3 illustrates an I3C Repeater, according to some embodiments of the disclosure.

FIG. 3 illustrates an I3C repeater, according to some embodiments of the disclosure. I3C repeater 300 may be substantially similar to I3C repeater 255 of FIG. 2. I3C repeater 300 may include one or more of: (a) an I2C-I3C converter for converting I2C-compliant transactions into I3C-compliant transactions (and vice-versa); (b) an SPI-I3C converter for converting SPI-compliant transactions into I3C-compliant transactions (and vice-versa); (c) a UART-I3C converter for converting UART-compliant transactions into I3C-compliant transactions (and vice-versa); and (d) a Debug-I3C converter for converting from Debug-bus-compliant transactions to I3C-compliant transactions (and vice-versa). The conversion of each such transaction may include the conversion of a data packet included with or otherwise accompanying the transaction. The I3C repeater 300 may assign header data as an address for each protocol while communicating with I3C master 205. I3C repeater 300 may also communicate with I3C master 205 about any guest protocols and corresponding conversions it may support.

I3C repeater 300 may include bus selection circuitry for enabling communication paths between the various communication protocols it supports. In some embodiments, I3C repeater 300 may include repeater control circuitry for selecting the communication paths to be enabled, and for controlling read and/or write operations on the I3C and I2C busses. The bus selection circuitry and repeater control circuitry may cooperatively forward transactions between an I3C transceiver and transceivers for one or more other supported communication protocols.

In some embodiments, I3C repeater 300 may include an I3C interface 306, and an I2C interface 356. I3C interface 306 may include an SDA signal path and an SCL signal path. I2C interface 356 may also include an SDA signal path and an SCL signal path.

I3C repeater 300 may also include one or more of an SPI interface 366, a UART interface 376, and a Debug bus interface 386. SPI interface 366 may include a Serial Clock (SCL) signal path, a Master Output/Slave Input (MOSI) signal path, and a Master Input/Slave Output (MISO) signal path. UART interface 376 may include a Transmitter (TX) signal path, a Receiver (RX) signal path, and a Reset (RST) signal path. Debug bus interface 386 may include a Debug Data signal path and a Debug Clock signal path.

I3C repeater 300 may also include an I3C repeater control 310, a bus selection circuitry 320. I3C repeater 300 may also include a control-data signal path 311, a bus-select signal path 312, and a handshake signal path 313, which may extend between I3C repeater control 310 and bus selection circuitry 320, and may aid I3C repeater 300 in forwarding transactions between the various interfaces.

I3C repeater 300 may include an I3C transceiver 304 operable to communicate with I3C devices over I3C interface 306. In the case in which an I3C transaction targeting an I2C device is received on I3C interface 306, I3C transceiver 304 may transfer the I3C transaction over a datapath 302 (and/or control path 303) to bus selection circuitry 320. From there, I3C repeater control 310 may interoperate with bus selection circuitry 320 may transfer the I3C transaction over datapath 352 to I2C-I3C converter 353.

I2C-I3C converter 353 may convert the I3C-compliant transaction into an I2C-compliant transaction. I2C-I3C converter 353 may comprise one or more buffers for receiving an I3C-compliant transaction or data packet over datapath 352, and buffering or otherwise storing the I3C-compliant transaction or data packet in a buffering circuitry, at an operating frequency of I3C interface 306. For example, I2C-I3C converter 353 may write an I3C-compliant transaction or data packet into a first-in first-out (FIFO) circuitry at the operating frequency of I3C interface 306.

In a complementary fashion, I2C-I3C converter 353 may then retrieve a stored I3C-compliant transaction or data packet from the buffering circuitry at an operating frequency of I2C interface 356. I2C-I3C converter 353 may convert the transaction or data packet retrieved from the buffering circuitry from an I3C-compliant transaction or data packet into an I2C-compliant transaction or data packet, such as by mapping various fields of control and/or data of the I3C-compliant transaction or data packet into various fields for an I2C-compliant transaction or data packet. I2C-I3C converter 353 may then transfer the newly-converted I2C transaction to an I2C transceiver 354. Finally, I2C transceiver 354 may then transfer the I2C transaction to I2C interface 356.

In the case in which an I2C transaction targeting an I3C device is received by I3C repeater 300, the transaction may flow through various elements of I3C repeater 300 in the opposite direction. First, I3C repeater 300 may receive the I2C transaction on I2C interface 356. I2C transceiver 354 may then transfer the I2C transaction to I2C-I3C converter 353, which may convert the I2C-compliant transaction into an I3C-compliant transaction. I2C-I3C converter 353 may comprise one or more buffers for receiving an I2C-compliant transaction or data packet from I2C transceiver 354, and buffering or otherwise storing the I2C-compliant transaction or data packet in a buffering circuitry, at an operating frequency of I2C interface 356. For example, I2C-I3C converter 353 may write an I2C-compliant transaction or data packet into a FIFO circuitry at the operating frequency of I2C interface 356.

In a complementary fashion, I2C-I3C converter 353 may retrieve a stored I2C-compliant transaction or data packet from the buffering circuitry at an operating frequency of I3C interface 306. I2C-I3C converter 353 may then convert the transaction or data packet retrieved from the buffering circuitry from an I2C-compliant transaction or data packet into an I3C-compliant transaction or data packet, such as by mapping various fields of control and/or data of the I2C-compliant transaction or data packet into various fields for an I3C-compliant transaction or data packet. I2C-I3C converter 353 may then transfer the newly-created I3C transaction over datapath 352 to bus selection circuitry 320.

I3C repeater control 310 and bus selection circuitry 320 may interoperate to transfer the newly-created I3C transaction over datapath 302 (and/or control path 303) to I3C transceiver 304. Finally, I3C transceiver 304 may then transfer the I3C transaction to I3C interface 306.

I3C repeater 300 may similarly transfer and convert transactions between I3C interface 306 and SPI interface 366, UART interface 376, and Debug bus interface 386. Transactions transferred between I3C interface 306 and SPI interface 366 may flow through a datapath 362, an SPI-I3C converter 363, and an SPI transceiver 364. Transactions transferred between I3C interface 306 and UART interface 376 may flow through a datapath 372, a UART-I3C converter 373, and a UART transceiver 374. Transactions transferred between I3C interface 306 and Debug bus interface 386 may flow through a datapath 382, a Debug-I3C converter 383, and a Debug transceiver 384. I3C repeater control 310 may interoperate with bus selection circuitry 320 to resolve any potential contention between transactions (e.g. competing transactions flowing toward I3C interface 306).

I3C repeater 300 may also include part or all of various registers 340, such as a Bus Characteristic Register (BCR) and a Legacy Register (LVR). BCR and/or LVR bits may be broadcast by I3C repeater 300 to an I3C Master to indicate the type of guest protocol and functionality supported. I3C repeater 300 may use BCR bits proposed as Reserved by an I3C protocol to indicate Guest or I2C communication. Tables 1 and 2 show proposed BCR settings and/or changes, while Table 3 shows proposed LVR settings and/or changes. During handshaking with an I3C Master, I3C repeater 300 may broadcast its register status as shown in Tables 1-3.

Table 1 shows BCR register bits that may be broadcast to an I3C Master. Setting {BCR[7], BCR[6]} equal to "11" may indicate to an I3C Master that I3C repeater 300 is guest-protocol and/or I2C-protocol compliant. Table 1 also provides descriptions for states in which {BCR[7], BCR[6]} are not equal to "11".

TABLE 1

| BIT | Name | Default | Broadcast | Description |
| --- | --- | --- | --- | --- |
| BCR [7] | Device Role [1] | 0 | 1 | 2'b00 - I3C Slave 2'b01 - I3C Secondary |
| BCR [6] | Device Role [0] | 0 | 1 | Master 2'b10 - Peer-To-Peer I3C Slave 2'b11 - Reserved |
| BCR [5] | SDR Only/SDR and HDR Capable | 0 | 1 | 0 - SDR only 1 - HDR Capable |
| BCR | Bridge Identifier | 0 | 1 | 0 - Not a Bridge Device |

TABLE 1-continued

| BIT | Name | Default | Broadcast | Description |
| --- | --- | --- | --- | --- |
| BCR [4] | Offline Capable | 0 | 0 | 1 - Is a Bridge Device 0 - Device will always respond I3C Bus commands 1 - Device will periodically not respond to I3C Bus commands |
| BCR [2] | Additional Register Indicator | 0 | 1 | Reserved for future to indicate additional register bytes. |
| BCR [1] | I3C Slave I2C only [1] (Indexed in Table 3) | 0 | 0 | 2'b00 - Index 0 2'b01 - Index 1 2'b10 - Index 2 |
| BCR [0] | I3C Slave I²C only [0] (Indexed in Table 3) | 0 | 0 | 2'b11 - Index 3 (Reserved) |

In addition, BCR[4] and BCR[2] may be used to indicate to an I3C Master the types of supported guest protocols and their functionality. When {BCR[7], BCR[6]} are equal to "11," BCR[4] and BCR[2] may indicate support for guest protocols in I3C repeater 300 as shown in Table 2.

TABLE 2

| BCR[4] | BCR[2] | Description |
| --- | --- | --- |
| 0 | 0 | Repeater supports I2C-I3C |
| 0 | 1 | Repeater supports I2C-I3C and SPI-I3C |
| 1 | 0 | Repeater supports I2C-I3C and UART-I3C |
| 1 | 1 | Repeater supports I2C-I3C, SPI-I3C, and UART-I3C |

Table 3 shows bit LVR[4], which may be set to indicate I2C support for Fast-mode (Fm) or Fast-mode plus (Fm+) in I3C repeater 300. LVR[4] may also be broadcast to an I3C Master.

TABLE 3

| BIT | Name | Default | Broadcast | Description |
| --- | --- | --- | --- | --- |
| LVR [4] | I²C Mode Indicator | 0 | 0 or 1 (depending upon on FM or FM+ bus) | 0 - I2C Fm+ 1 - I2C Fm |

In some embodiments, I3C repeater 300 may also include one or more internal oscillators 350 to provide clocks within I3C repeater 300. Accordingly, I3C repeater 300 may not avoid depending upon an external clock or clock information from an I3C master. Instead, I3C repeater 300 may synchronize to transactions received on one or more of the various protocol interfaces (e.g. an I2C interface).

Figure 4:
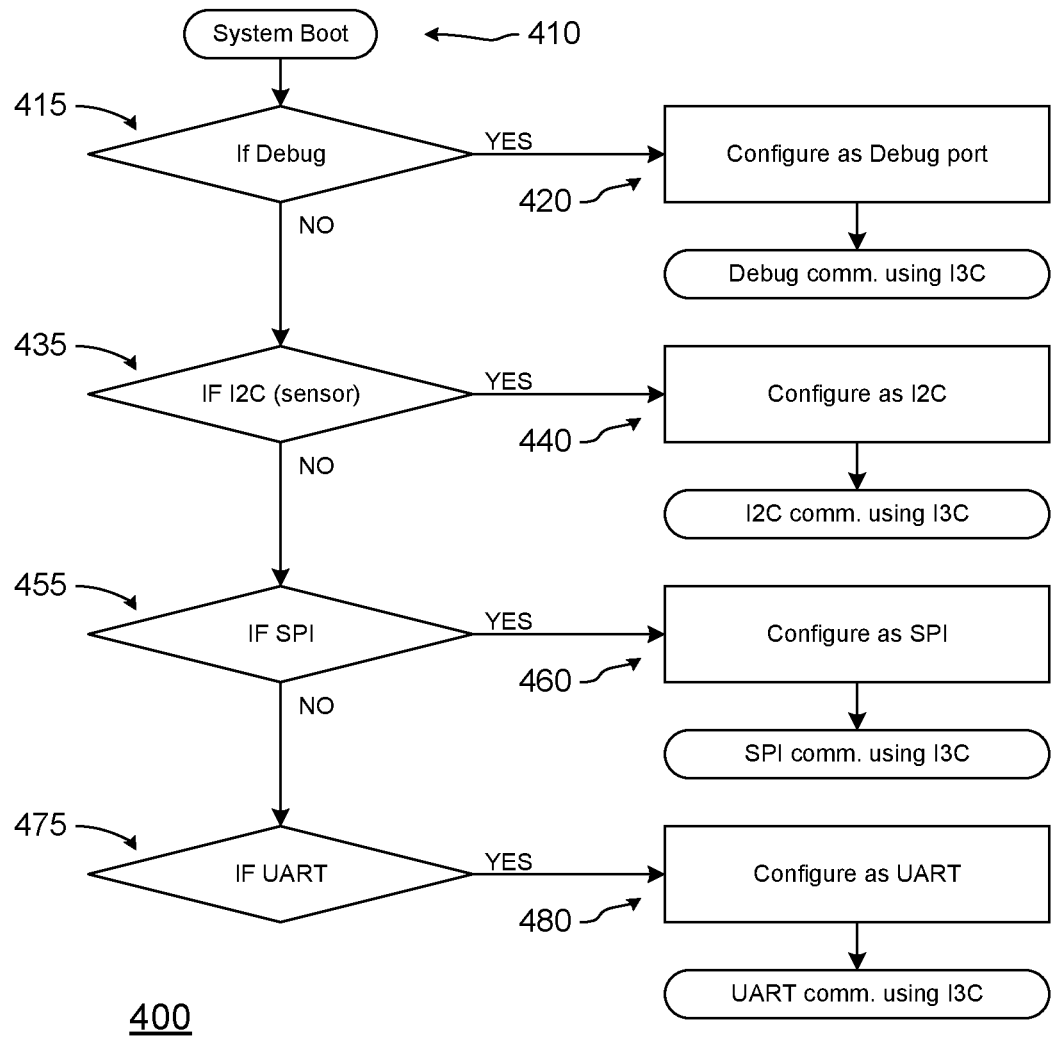
FIG. 4 illustrates a guest protocol selection flow, according to some embodiments of the disclosure.

FIG. 4 illustrates a guest protocol selection flow, according to some embodiments of the disclosure. Flow 400 may correspond to an arbitration established by an I3C Repeater control circuitry such as I3C repeater control 310. In flow 400, Debug transactions (which may be received in a Debug mode) may be assigned to have a highest priority, followed by I2C transactions (which may include sensor data), then SPI transactions, then UART transactions. In some embodiments, the priority between the various protocols may be different, and assignment of priorities between the various protocols may additionally be configurable.

As depicted, a guest protocol may be selected based on transactions received the various interfaces. Upon guest-protocol selection, the I3C Repeater (e.g. I3C repeater 255 or I3C repeater 300) may select and otherwise enable the path between the corresponding converter and the I3C transceiver in order to forward the transaction (and any included or accompanying data packet) to the I3C bus. When configured by the I3C Repeater control circuitry to enable communication between the I3C interface and another interface, the I3C Repeater may be operable to establish a dedicated bi-directional path for transaction traffic between the two interfaces.

In some embodiments, after a system boot 410, if an evaluation 415 detects a transaction either received on the Debug bus interface (e.g. Debug bus interface 386) or targeting the Debug bus interface, a selection 420 may configure the I3C Repeater to enable Debug-I3C communication. If not, then if an evaluation 435 detects a transaction (such as a transaction bearing sensor data) either received on the I2C interface (e.g. I2C interface 356) or targeting the I2C interface, a selection 440 may configure the I3C Repeater to enable I2C-I3C communication. If not, then if an evaluation 455 detects a transaction either received on the SPI interface (e.g. SPI interface 366) or targeting the SPI interface, a selection 460 may configure the I3C Repeater to enable SPI-I3C communication. If not, then if an evaluation 475 detects a transaction either received on the UART interface (e.g. UART interface 376) or targeting the UART interface, a selection 480 may configure the I3C Repeater to enable UART-I3C communication.

I3C Repeaters (and/or I3C Masters) may also include address decoding logic for processing one or more I3C Command codes to indicate information about guest protocols to I3C Repeaters. Table 4 shows a Command code that may be decoded by an I3C Repeater.

TABLE 4

| Command Code | CCC Type | Required | Command Name | Default | Brief Description |
|---|---|---|---|---|---|
| 0x92 | Direct Set | N | Set Bridge Targets (SETBRGTGT) | — | This allows Masters to inform a bridge (to/from I2C, SPI, UART, etc.) of the endpoints it is talking to (both dynamic address to match, and what type/ID). |

Figure 5:
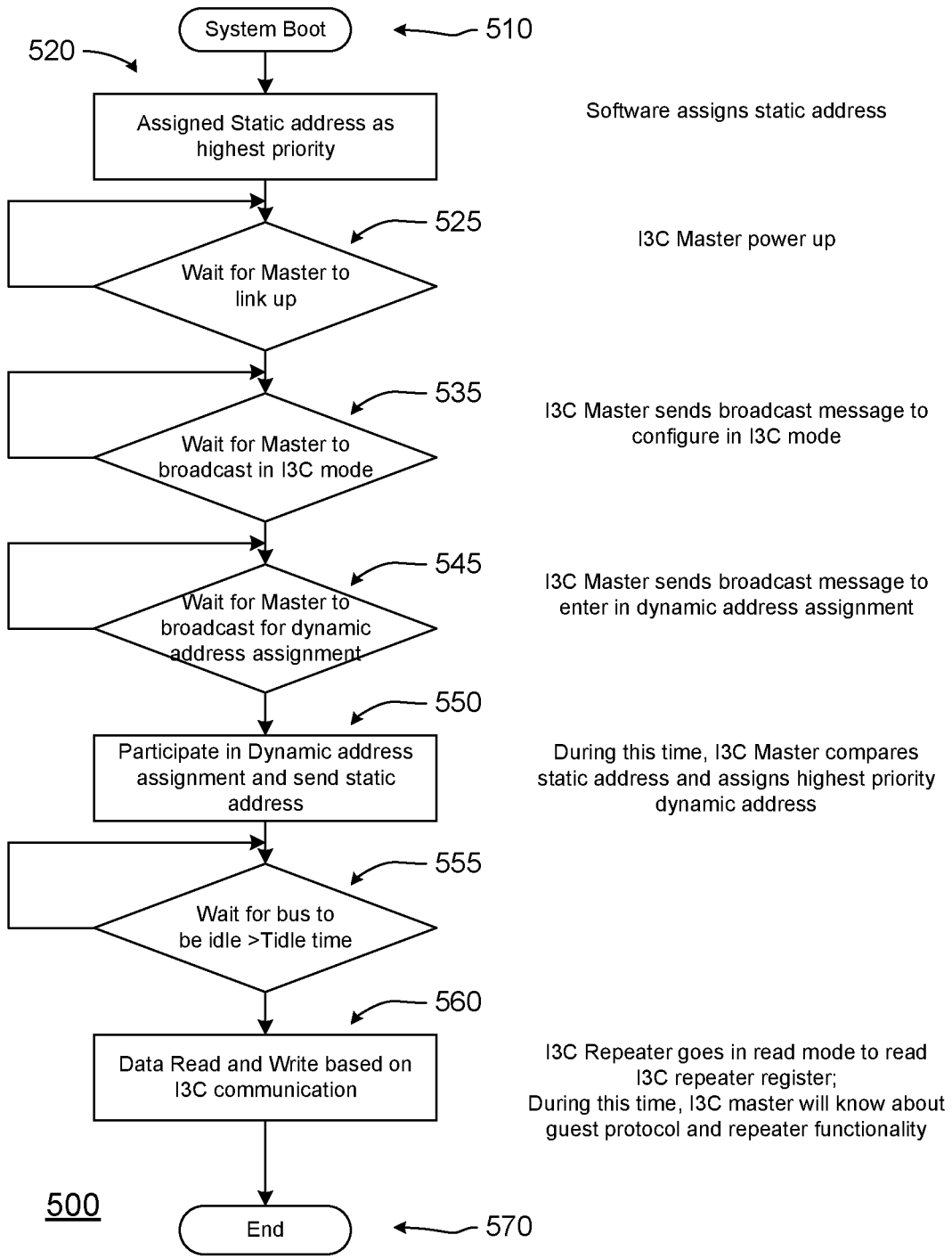
FIG. 5 illustrates a high-level configuration flow, according to some embodiments of the disclosure.

FIG. 5 illustrates a high-level configuration flow, according to some embodiments of the disclosure. In flow 500, in an action 520 following a system boot 510, each communication protocol in a system such as system 200 may be assigned a highest-priority address to be used by an I3C Repeater (such as I3C repeater 255 or I3C repeater 300) during arbitration. Then, in an evaluation 525, one or more elements of the system may wait for an I3C Master link to be up. Next, in an evaluation 535, one or more elements of the system may wait for the I3C Master to broadcast a message for I3C mode and address assignment. Then, in an evaluation 545, one or more elements of the system may wait for an I3C Master to broadcast a message to enter into dynamic address assignment. Then, in an action 550 for address assignment, one or more elements of the system may wait for the I3C Master to assign highest priority to the I3C Repeater, which may be used for guest communication, and which may also be used for I2C related communication. Then, in an evaluation 555, one or more elements of the system may wait for the bus to be idle for longer than a $T_{IDLE}$ time, I2C communication or guest protocol communication may happen, and packets may be forwarded using addresses appended to their data packets. Then, in an action 560, an I3C Master may access one or more I3C Repeater registers to determine guest-protocol support in the I3C Repeater. Finally, flow 500 may reach an end 570, and communication may subsequently proceed over the I3C bus as defined in the I3C protocol.

Accordingly, in various embodiments, an I3C Repeater may be assigned a static address as the highest priority. The I3C Repeater may have higher priority than other agents and/or devices on the I3C bus (i.e., the I3C Repeater may be a secondary master on the I3C bus). Subsequently, traffic between an I3C interface and one or more guest-protocol interfaces may be enabled through the I3C Repeater.

Figure 6:
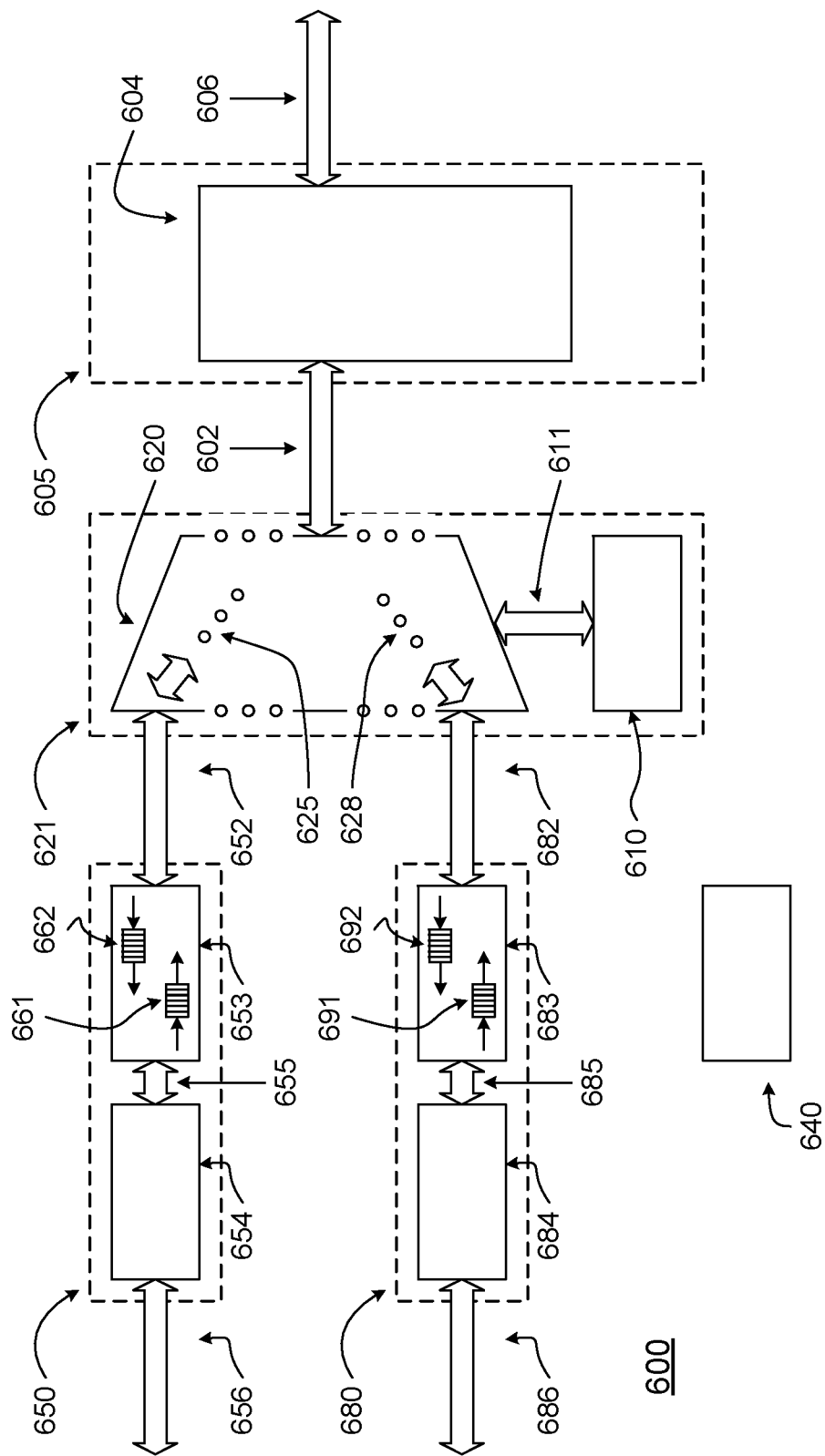
FIG. 6 illustrates an I3C Repeater, according to some embodiments of the disclosure.

FIG. 6 illustrates an I3C Repeater, according to some embodiments of the disclosure. I3C repeater 600 may be substantially similar to I3C repeater 255 and/or I3C repeater 300.

In some embodiments, I3C repeater 600 may comprise a first circuitry 605 having a first input/output (IO) interface 606, a second circuitry 650 having a second input/output (IO) interface 656, and a datapath circuitry 621, which may be coupled to first circuitry 605 by a datapath 602 and may be coupled to second circuitry 650 by a datapath 652. Second circuitry 650 may be operable to convert a transaction received on second IO interface 656 into a transaction for first IO interface 606, and to convert a transaction received on first IO interface 606 into a transaction for second IO interface 656.

First IO interface 606 may have a serial data bus which is operable at a first frequency, and second IO interface 656 may have a serial data bus which is operable at a second frequency, the first frequency being greater than the second frequency. In addition, first IO interface 606 may be operable at a first high-voltage level, and second IO interface 656 may be operable at a second high-voltage level greater than the first high-voltage level. A first part of second circuitry 650 may be driven by a first clock source operable at the first frequency and a first supply voltage operable at the first high-voltage level, and a separate second part of second circuitry 650 may be driven by a separate second clock source operable at the second frequency and a separate second supply voltage operable at the second high-voltage level. Second circuitry 650 may thus be operable to electrically isolate first IO interface 606 from second IO interface 656.

I3C repeater 600 may also have a third circuitry 680 having a third input/output (IO) interface 686. Third circuitry 680 may be operable to convert a transaction received on third IO interface 686 into a transaction for first IO interface 606, and to convert a transaction received on first IO interface 606 into a transaction for third IO interface 686.

Third IO interface 686 may have a bus which is operable at a third frequency, and the first frequency may be greater than the third frequency. Third IO interface 686 may also be operable at a third high-voltage level, and the third high-voltage level may be greater than the first high-voltage level. A first part of third circuitry 680 may be operable at the first frequency and may be driven by the first clock source and the first supply voltage, and a separate second part of third circuitry 680 may be driven by a separate third clock source operable at the third frequency and a separate third supply voltage operable at the third high-voltage level. Third circuitry 680 may thus be operable to electrically isolate first IO interface 606 from third IO interface 686.

Datapath circuitry 621 may be operable to forward a transaction received on second IO interface 656 to first circuitry 605, and may be operable to forward a transaction received on third IO interface 686 to first circuitry 605. Datapath circuitry 621 may also be operable to arbitrate between a transaction received on second IO interface 656 and a transaction received on third IO interface 686. A transaction that wins the arbitration may accordingly flow through datapath circuitry 621 and to first IO interface 606. Datapath circuitry 621 may also be operable to arbitrate between second IO interface 656 and third IO interface 686 to establish selection of a bi-directional path for traffic to flow both to and from first IO interface 606. Datapath circuitry 621 may employ various algorithms in arbitrating between IO interfaces. In some embodiments, datapath circuitry 621 may employ a round-robin arbitration algorithm, while in other embodiments, datapath circuitry 621 may employ weighted round-robin arbitration algorithm. In various embodiments, datapath circuitry 621 may employ any of a variety of algorithms to arbitrate between IO interfaces.

First IO interface 606 may be an I3C interface. Second IO interface 656 may be an I2C interface. Third IO interface 686 may be one of an SPI bus, a UART bus, and a Debug bus, as shown in FIG. 3. The first operating frequency may be approximately 12.9 MHz max, and the second operating frequency may be approximately 1.0 MHz max (e.g. an Fm+ frequency). In some embodiments, the second operating frequency could be another frequency, such as approximately 10 kHz max (e.g. a low-speed mode I2C frequency), approximately 100 kHz max (e.g. a standard mode I2C frequency), approximately 400 kHz max (e.g. a Fast mode or full speed I2C frequency), approximately 3.4 MHz max (e.g. a High-speed mode I2C frequency), or approximately 5.0 MHz max (e.g. an Ultra Fast-mode I2C frequency).

In various embodiments, I3C repeater 600 may include additional circuitries having additional input/output (IO) interfaces, such as one or more of an SPI bus, a UART bus, and a Debug bus. In such embodiments, the additional circuitries may be operable to convert transactions received on the corresponding additional IO interfaces into transactions for first IO interface 606, and to convert transactions received on first IO interface 606 into transactions for the corresponding additional IO interfaces. Datapath circuitry 621 may also be operable to arbitrate between transactions received on the corresponding additional IO interfaces and transactions received on second IO interface 656 and/or third IO interface 686.

I3C repeater 600 may also include one or more internal oscillators 640 operable to provide one or more internal clock signals to various circuitries within I3C repeater 600, such as first circuitry 605, second circuitry 650, or third circuitry 680.

In further embodiments, I3C repeater 600 may comprise a host-protocol transceiver 604, a first guest-protocol transceiver 654, and a second guest-protocol transceiver 684. Host-protocol transceiver 604 may be coupled to a host-protocol IO interface, such as first IO interface 606. The host-protocol IO interface may have a serial data bus. Host-protocol transceiver 604 may also be coupled through a datapath 602 to a bus selection circuitry 620.

First guest-protocol transceiver 654 may be coupled to a first guest-protocol IO interface, such as second IO interface 656. The first guest-protocol IO interface may have a serial data bus. First guest-protocol transceiver 654 may be coupled through a datapath 655 to a first guest-protocol conversion circuitry 653, and may be further coupled through first guest-protocol conversion circuitry 653 to datapath 652, and may be further coupled through datapath 652 to bus selection circuitry 620.

First guest-protocol conversion circuitry 653 may be operable to convert a transaction received by first guest-protocol transceiver 654 into a transaction for host-protocol transceiver 604. First guest-protocol conversion circuitry 653 may comprise one or more first buffers 661 operable to buffer or otherwise store transactions or data packets received through datapath 655 at the second frequency (e.g., at an operating frequency of second IO interface 656).

First guest-protocol conversion circuitry 653 may then be operable to retrieve a stored transaction or data packet from first buffers 661 at the first frequency (e.g., at an operating frequency of first IO interface 606). First guest-protocol conversion circuitry 653 may convert the retrieved transaction or data packet from a transaction or data packet compliant with second IO interface 656 into a transaction or data packet compliant with first IO interface 606. For example, first guest-protocol conversion circuitry 653 may map one or more fields of control and/or data from a transaction or data packet retrieved from first buffers 661 into one or more fields for a transaction or data packet compliant with first IO interface 606.

First guest-protocol conversion circuitry 653 may accordingly buffer transactions or data packets compliant with second IO interface 656 and subsequently convert them into transactions compliant with first IO interface 606. For some alternate embodiments, first guest-protocol conversion circuitry 653 may convert such transactions or data packets before buffering them. In such embodiments, first guest-protocol conversion circuitry 653 may first convert a transaction or data packet received through datapath 655 into a transaction or data packet compliant with first IO interface 606, then buffer or otherwise store the converted transaction in first buffers 661, then retrieve a stored transaction or data packet from first buffers 661.

Similarly, first guest-protocol conversion circuitry 653 may be operable to convert a transaction received by host-protocol transceiver 604 into a transaction for first guest-protocol transceiver 654. First guest-protocol conversion circuitry 653 may comprise one or more second buffers 662 operable to buffer or otherwise store transactions or data packets received through datapath 652 at the first frequency.

First guest-protocol conversion circuitry 653 may then be operable to retrieve a stored transaction or data packet from second buffers 662 at the second frequency. First guest-protocol conversion circuitry 653 may convert the retrieved transaction or data packet from a transaction or data packet compliant with first IO interface 606 into a transaction or data packet compliant with second IO interface 656. For example, first guest-protocol conversion circuitry 653 may map one or more fields of control and/or data from the transaction or data packet retrieved from second buffers 662 into one or more fields for a transaction or data packet compliant with second IO interface 656.

First guest-protocol conversion circuitry 653 may accordingly buffer transactions or data packets compliant with first IO interface 606 and subsequently convert them into transactions compliant with second IO interface 656. For some alternate embodiments, first guest-protocol conversion circuitry 653 may convert such transactions or data packets before buffering them. In such embodiments, first guest-protocol conversion circuitry 653 may first convert a transaction or data packet received through 655 into a transaction or data packet compliant with second IO interface 656, then buffer or otherwise store the converted transaction in first buffers 661, then retrieve a stored transaction or data packet from first buffers 661.

A first part of first guest-protocol conversion circuitry 653 may be driven by the first clock source and the first supply voltage, and a separate second part of first guest-protocol conversion circuitry 653 may be driven by the second clock source and the second supply voltage. First guest-protocol conversion circuitry 653 may accordingly be operable to electrically isolate first IO interface 606 from second IO interface 656.

Meanwhile, second guest-protocol transceiver 684 may be coupled to a second guest-protocol IO interface, such as third IO interface 686. Second guest-protocol transceiver 684 may be coupled through a datapath 685 to a second guest-protocol conversion circuitry 683, and may be further coupled through second guest-protocol conversion circuitry 683 to datapath 682, and may be further coupled through datapath 682 to bus selection circuitry 620.

Second guest-protocol conversion circuitry 683 may be operable to convert a transaction received by second guest-protocol transceiver 684 into a transaction for host-protocol transceiver 604. Second guest-protocol conversion circuitry 683 may comprise one or more first buffers 691 operable to buffer or otherwise store transactions or data packets received through datapath 685 at the third frequency (e.g., at an operating frequency of third IO interface 686).

Second guest-protocol conversion circuitry 683 may then be operable to retrieve a stored transaction or data packet from first buffers 691 at the first frequency (e.g., at an operating frequency of first IO interface 606). Second guest-protocol conversion circuitry 683 may convert the retrieved transaction or data packet from a transaction or data packet compliant with third IO interface 686 into a transaction or data packet compliant with first IO interface 606. For example, second guest-protocol conversion circuitry 683 may map one or more fields of control and/or data from a transaction or data packet retrieved from first buffers 691 into one or more fields for a transaction or data packet compliant with first IO interface 606.

Second guest-protocol conversion circuitry 683 may accordingly buffer transactions or data packets compliant with third IO interface 686 and subsequently convert them into transactions compliant with first IO interface 606. For some alternate embodiments, second guest-protocol conversion circuitry 683 may convert such transactions or data packets before buffering them. In such embodiments, second guest-protocol conversion circuitry 683 may first convert a transaction or data packet received through datapath 685 into a transaction or data packet compliant with first IO interface 606, then buffer or otherwise store the converted transaction in first buffers 661, then retrieve a stored transaction or data packet from first buffers 661.

Similarly, first guest-protocol conversion circuitry 653 may be operable to convert a transaction received by host-protocol transceiver 604 into a transaction for second guest-protocol transceiver 684. Second guest-protocol conversion circuitry 683 may comprise one or more second buffers 692 operable to buffer or otherwise store transactions or data packets received through datapath 682 at the first frequency.

Second guest-protocol conversion circuitry 683 may then be operable to retrieve a stored transaction or data packet from second buffers 692 at the third frequency. Second guest-protocol conversion circuitry 683 may convert the retrieved transaction or data packet from a transaction or data packet compliant with first IO interface 606 into a transaction or data packet compliant with third IO interface 686. For example, second guest-protocol conversion circuitry 683 may map one or more fields of control and/or data from the transaction or data packet retrieved from second buffers 692 into one or more fields for a transaction or data packet compliant with third IO interface 686.

Second guest-protocol conversion circuitry 683 may accordingly buffer transactions or data packets compliant with first IO interface 606 and subsequently convert them into transactions compliant with third IO interface 686. For some alternate embodiments, second guest-protocol conversion circuitry 683 may convert such transactions or data packets before buffering them. In such embodiments, second guest-protocol conversion circuitry 683 may first convert a transaction or data packet received through datapath 685 into a transaction or data packet compliant with third IO interface 686, then buffer or otherwise store the converted transaction in second buffers 691, then retrieve a stored transaction or data packet from second buffers 691.

A first part of second guest-protocol conversion circuitry 683 may be driven by the first clock source and the first supply voltage, and a separate second part of second guest-protocol conversion circuitry 683 may be driven by the third clock source and the third supply voltage. Second guest-protocol conversion circuitry 683 may accordingly be operable to electrically isolate first IO interface 606 from third IO interface 686.

Bus selection circuitry 620 may include a first datapath circuitry 625 and a second datapath circuitry 628. First datapath circuitry 625 may be operable to forward a transaction from first guest-protocol conversion circuitry 653 to host-protocol transceiver 604, and may be operable to forward a transaction from host-protocol transceiver 604 to first guest-protocol conversion circuitry 653. In some embodiments, second datapath circuitry 628 may be operable to forward a transaction from second guest-protocol conversion circuitry 683 to host-protocol transceiver 604, and may be operable to forward a transaction from host-protocol transceiver 604 to second guest-protocol conversion circuitry 683.

Bus selection circuitry 620 may be coupled to a control circuitry 610 through a control path 611, and may be operable to select between first datapath circuitry 625 and second datapath circuitry 628. Control circuitry 610 may interoperate with bus selection circuitry 620 to transfer transactions between first guest-protocol conversion circuitry 653 and host-protocol transceiver 604, and to transfer transactions between second guest-protocol conversion circuitry 683 and host-protocol transceiver 604.

The serial bus of the host-protocol IO interface may be operable at a first frequency, and the serial bus of the first guest-protocol IO interface may be operable at a second frequency, the first frequency being greater than the second frequency. In addition, the host-protocol IO interface may be operable at a first high-voltage level, and the first guest-protocol IO interface may be operable at a second high-voltage level, the first high-voltage level being less than the second high-voltage level. First guest-protocol transceiver 654 may accordingly be operable to electrically isolate the first guest-protocol IO interface from the host-protocol IO interface.

The host-protocol IO interface may be an I3C interface, which may include a serial clock line and a serial data line. The first guest-protocol IO interface may be an I2C interface, which may also include a serial clock line and a serial data line. The second guest-protocol IO interface may be one of an SPI interface, a UART interface, and a Debug bus interface. The first operating frequency may be approximately 12.9 MHz max, and the second operating frequency may be approximately 1.0 MHz max. In some embodiments, the second operating frequency could be another frequency, such as approximately 10 kHz max, approximately 100 kHz max, approximately 400 kHz max, approximately 3.4 MHz max, or approximately 5.0 MHz max.

In some embodiments, I3C repeater 600 may include additional transceiver and conversion circuitries corresponding to one or more of an SPI bus, a UART bus, and a Debug bus. In such embodiments, the additional transceiver and conversion circuitries may be operable to receive transactions on the corresponding additional IO interfaces, and to convert the received transactions into transactions for the host-protocol IO interface. The additional transceiver and conversion circuitries may also be operable to convert transactions received on the host-protocol IO interface into transactions for the corresponding additional IO interfaces, and to transmit the converted transactions on the corresponding additional IO interfaces. Bus selection circuitry 620 may also be operable to select between transactions received on the corresponding additional IO interfaces and transactions received on the first guest-protocol interface and/or the second guest-protocol interface.

Figure 7:
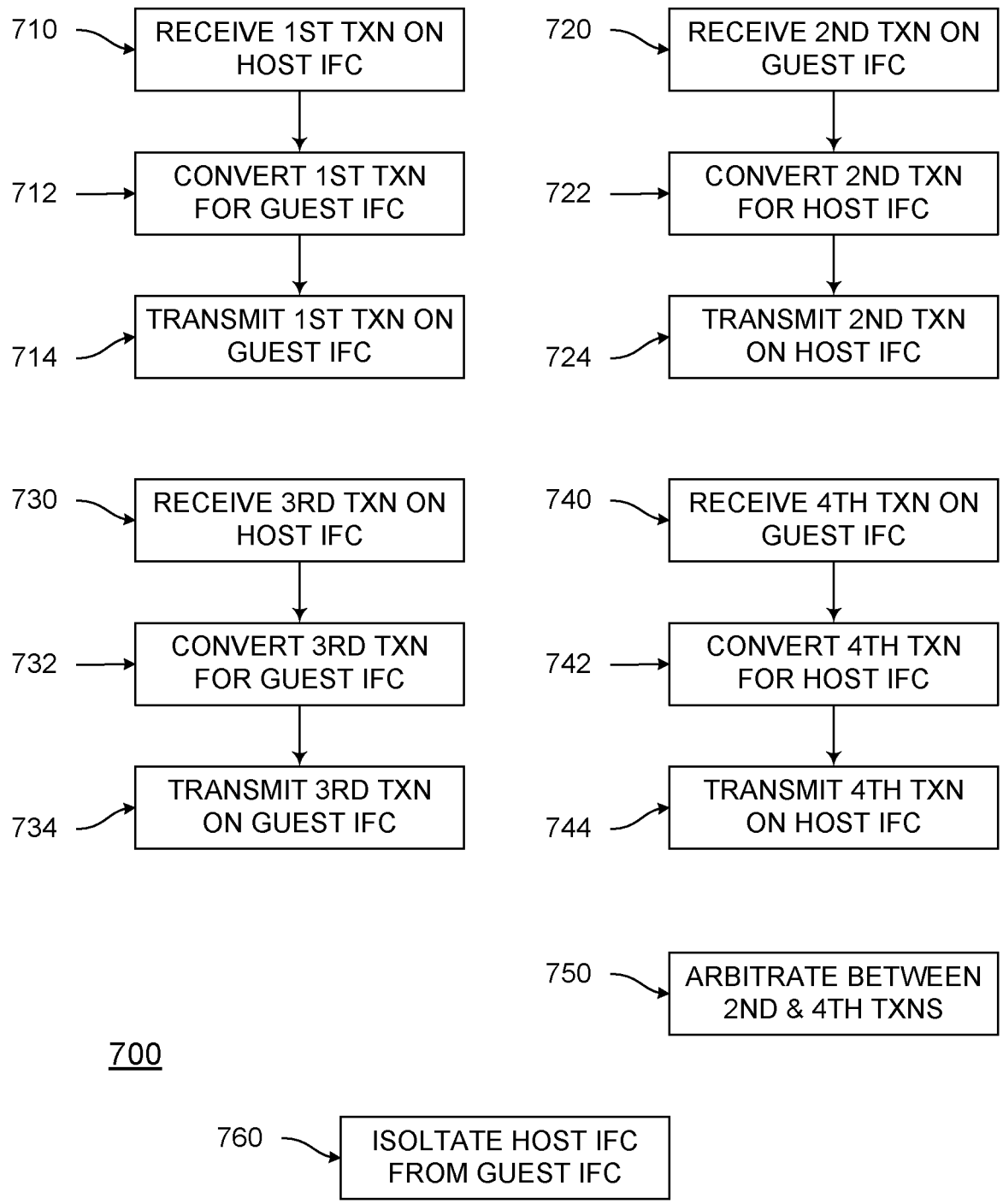
FIG. 7 illustrates a method for handling host-protocol and guest-protocol traffic, according to some embodiments of the disclosure.

FIG. 7 illustrates a method for handling host-protocol and guest-protocol traffic, according to some embodiments of the disclosure. A method 700 may be executed by an I3C Repeater (such as I3C repeater 255, I3C repeater 300, and/or I3C repeater 600). Method 700 may include a receiving 710, a converting 712, and a transmitting 714. In receiving 710, a first transaction may be received on a host-protocol input/output (IO) interface. In converting 712, the first transaction may be converted into a transaction for a guest-protocol input/output (IO) interface. In transmitting 714, the converted first transaction may be transmitted on the guest-protocol IO interface.

Method 700 may also include a receiving 720, a converting 722, and a transmitting 724. In receiving 720, a second transaction may be received on the guest-protocol IO interface. In converting 722, the second transaction may be converted into a transaction for the host-protocol input/output (IO) interface. In transmitting 724, the converted second transaction may be transmitted on the host-protocol IO interface.

The host-protocol IO interface may have a serial data bus which is operable at a first frequency, and the guest-protocol IO interface may have a serial data bus which is operable at a second frequency, the first frequency being greater than the second frequency. The host-protocol IO interface may be an I3C interface, and the guest-protocol IO interface may be an I2C interface.

Method 700 may also include a receiving 730, a converting 732, and a transmitting 734, and may have a receiving 740, a converting 742, and a transmitting 744. In receiving 730, a third transaction may be received on the host-protocol IO interface. In converting 732, the third transaction may be converted into a transaction for an additional guest-protocol input/output (IO) interface. In transmitting 734, the converted third transaction may be transmitted on the additional guest-protocol IO interface. In receiving 740, a fourth transaction may be received on the additional guest-protocol IO interface. In converting 742, the fourth transaction may be converted into a transaction for the host-protocol IO interface. In transmitting 744, the converted fourth transaction may be transmitted on the host-protocol IO interface. The additional guest-protocol IO interface may be one of an SPI bus, a UART bus, and a debug bus.

Method 700 may also include an arbitrating 750 and an isolating 760. In arbitrating 750, an arbitration may be performed between the second transaction and the fourth transaction. In isolating 760, the host-protocol IO interface may be isolated electrically from the guest-protocol IO interface.

Although the actions in the flowchart with reference to FIG. 7 are shown in a particular order, the order of the actions can be modified. Thus, the illustrated embodiments can be performed in a different order, and some actions may be performed in parallel. Some of the actions and/or operations listed in FIG. 7 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause one or more processors to perform an operation comprising method 700. Such machine readable storage media may include any of a variety of storage media, like magnetic storage media (e.g. magnetic tapes or magnetic disks), optical storage media (e.g. optical discs), electronic storage media (e.g. conventional hard disk drives, solid-state disk drives, or flash-memory-based storage media), or any other tangible storage media or non-transitory storage media.

Figure 8:
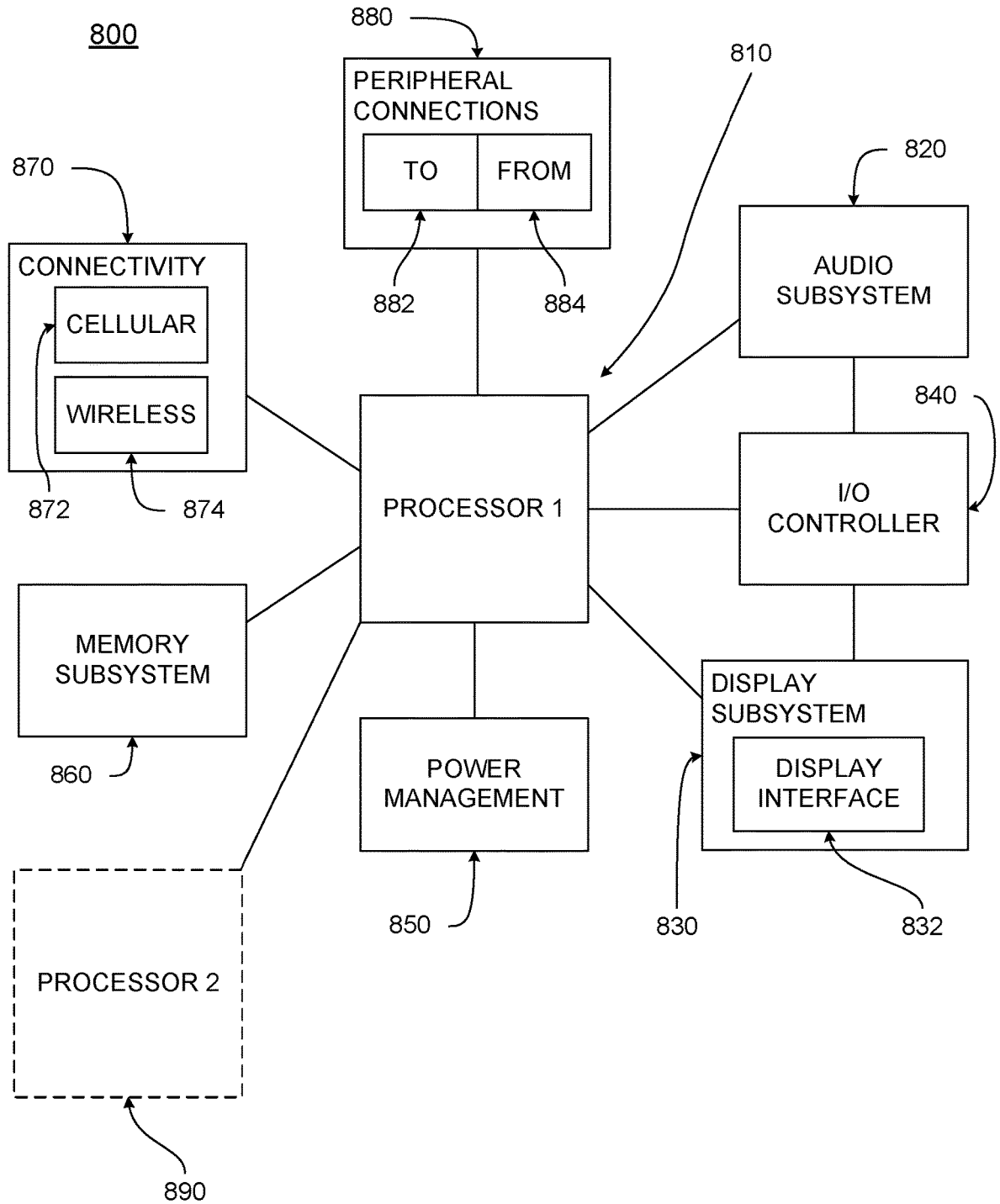
FIG. 8 illustrates a computing device with an I3C Repeater, according to some embodiments of the disclosure.

FIG. 8 illustrates a computing device with an I3C Repeater, according to some embodiments of the disclosure. More particularly, computing device 800 may be a computer system, a System-on-a-Chip (SoC), a tablet, a mobile device, a smart device, or a smart phone with an I3C Repeater, according to some embodiments of the disclosure. It will be understood that certain components of computing device 800 are shown generally, and not all components of such a device are shown FIG. 8. Moreover, while some of the components may be physically separate, others may be integrated within the same physical package, or even on the same physical silicon die. Accordingly, the separation between the various components as depicted in FIG. 8 may not be physical in some cases, but may instead be a functional separation. It is also pointed out that those elements of FIG. 8 having the same names or reference numbers as the elements of any other figure can operate or function in any manner similar to that described, but are not limited to such.

In various embodiments, the components of computing device 800 may include any of a processor 810, an audio subsystem 820, a display subsystem 830, an I/O controller 840, a power management component 850, a memory subsystem 860, a connectivity component 870, one or more peripheral connections 880, and one or more additional processors 890. In some embodiments, processor 810 may include an I3C Repeater, according to some embodiments of the disclosure. In various embodiments, however, any of the components of computing device 800 may include an I3C Repeater, according to some embodiments of the disclosure. In addition, one or more components of computing device 800 may include an interconnect fabric having a plurality of ports, such as a router, a network of routers, or a Network-on-a-Chip (NoC).

Processor 810 may be a general-purpose processor or CPU (Central Processing Unit). In some embodiments, processor 810 may include one or more physical devices, such as microprocessors, application processors, microcontrollers, programmable logic devices, or other processing means. The processing operations performed by processor 810 may include the execution of an operating platform or operating system on which applications and/or device functions may then be executed. The processing operations may also include operations related to one or more of the following: audio I/O; display I/O power management; connecting computing device 800 to another device; and/or I/O (input/output) with a human user or with other devices.

Audio subsystem 820 may include hardware components (e.g., audio hardware and audio circuits) and software components (e.g., drivers and/or codecs) associated with providing audio functions to computing device 800. Audio functions can include speaker and/or headphone output as well as microphone input. Devices for such functions can be integrated into computing device 800, or connected to computing device 800. In one embodiment, a user interacts with computing device 800 by providing audio commands that are received and processed by processor 810.

Display subsystem 830 may include hardware components (e.g., display devices) and software components (e.g., drivers) that provide a visual and/or tactile display for a user to interact with computing device 800. Display subsystem 830 may include a display interface 832, which may be a particular screen or hardware device used to provide a display to a user. In one embodiment, display interface 832 includes logic separate from processor 810 to perform at least some processing related to the display. In some embodiments, display subsystem 830 includes a touch screen (or touch pad) device that provides both output and input to a user.

I/O controller 840 may include hardware devices and software components related to interaction with a user. I/O controller 840 may be operable to manage hardware that is part of audio subsystem 820 and/or display subsystem 830. Additionally, I/O controller 840 may be a connection point for additional devices that connect to computing device 800, through which a user might interact with the system. For example, devices that can be attached to computing device 800 might include microphone devices, speaker or stereo systems, video systems or other display devices, keyboard or keypad devices, or other I/O devices for use with specific applications such as card readers or other devices.

As mentioned above, I/O controller 840 can interact with audio subsystem 820 and/or display subsystem 830. For example, input through a microphone or other audio device can provide input or commands for one or more applications or functions of computing device 800. Additionally, audio output can be provided instead of, or in addition to, display output. In another example, if display subsystem 830 includes a touch screen, the display device may also act as an input device, which can be at least partially managed by I/O controller 840. There can also be additional buttons or switches on computing device 800 to provide I/O functions managed by I/O controller 840.

In some embodiments, I/O controller 840 manages devices such as accelerometers, cameras, light sensors or other environmental sensors, or other hardware that can be included in computing device 800. The input can be part of direct user interaction, and may provide environmental input to the system to influence its operations (such as filtering for noise, adjusting displays for brightness detection, applying a flash for a camera, or other features).

Power management component 850 may include hardware components (e.g., power management devices and/or circuitry) and software components (e.g., drivers and/or firmware) associated with managing battery power usage, battery charging, and features related to power saving operation.

Memory subsystem 860 may include one or more memory devices for storing information in computing device 800. Memory subsystem 860 can include nonvolatile memory devices (whose state does not change if power to the memory device is interrupted) and/or volatile memory devices (whose state is indeterminate if power to the memory device is interrupted). Memory subsystem 860 can store application data, user data, music, photos, documents, or other data, as well as system data (whether long-term or temporary) related to the execution of the applications and functions of computing device 800.

Some portion of memory subsystem 860 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity component 870 may include a network interface, such as a cellular interface 872 or a wireless interface 874 (so that an embodiment of computing device 800 may be incorporated into a wireless device such as a cellular phone or a personal digital assistant). In some embodiments, connectivity component 870 includes hardware devices (e.g., wireless and/or wired connectors and communication hardware) and software components (e.g., drivers and/or protocol stacks) to enable computing device 800 to communicate with external devices. Computing device 800 could include separate devices, such as other computing devices, wireless access points or base stations, as well as peripherals such as headsets, printers, or other devices.

In some embodiments, connectivity component 870 can include multiple different types of network interfaces, such as one or more wireless interfaces for allowing processor 810 to communicate with another device. To generalize, computing device 800 is illustrated with cellular interface 872 and wireless interface 874. Cellular interface 872 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 874 refers generally to non-cellular wireless interfaces, and can include personal area networks (such as Bluetooth, Near Field, etc.), local area networks (such as Wi-Fi), and/or wide area networks (such as WiMax), or other wireless communication.

Peripheral connections 880 may include hardware interfaces and connectors, as well as software components (e.g., drivers and/or protocol stacks) to make peripheral connections. It will be understood that computing device 800 could both be a peripheral device to other computing devices (via "to" 882), as well as have peripheral devices connected to it (via "from" 884). The computing device 800 may have a "docking" connector to connect to other computing devices for purposes such as managing content on computing device 800 (e.g., downloading and/or uploading, changing, synchronizing). Additionally, a docking connector can allow computing device 800 to connect to certain peripherals that allow computing device 800 to control content output, for example, to audiovisual or other systems.

In addition to a proprietary docking connector or other proprietary connection hardware, computing device 800 can make peripheral connections 880 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Computing device 800 may be a smart device, smart phone, tablet, computer system, or SoC with an I3C Repeater, according to some embodiments of the disclosure. FIG. 8 illustrates a block diagram of an embodiment of a mobile device which may be operable to use flat surface interface connectors. In one embodiment, computing device 800 may be a mobile computing device, such as a computing tablet, a mobile phone or smart-phone, a wireless-enabled e-reader, or other wireless mobile device. It will be understood that certain components are shown generally, and not all components of such a device are shown in computing device 800.

Computing device 800 includes a first processor 810 with an I3C Repeater, according to some embodiments discussed. Other blocks of computing device 800 may also include the I3C Repeater of some embodiments. The various embodiments of the present disclosure may also comprise a network interface within 870 such as a wireless interface so that a system embodiment may be incorporated into a wireless device, for example a cell phone or personal digital assistant.

In some embodiments, processor 810 can include one or more physical devices, such as microprocessors, application processors, microcontrollers, programmable logic devices, or other processing means. The processing operations performed by processor 810 may include the execution of an operating platform or operating system on which applications and/or device functions may then be executed. The processing operations may also include operations related to one or more of the following: I/O (input/output) with a human user or with other devices; power management; connecting computing device 800 to another device; audio I/O; and/or display I/O.

In some embodiments, computing device 800 includes an audio subsystem 820, which represents hardware components (e.g., audio hardware and audio circuits) and software components (e.g., drivers and/or codecs) associated with providing audio functions to computing device 800. Audio functions can include speaker and/or headphone output as well as microphone input. Devices for such functions can be integrated into computing device 800, or connected to computing device 800. In one embodiment, a user interacts with computing device 800 by providing audio commands that are received and processed by processor 810.

In some embodiments, computing device 800 includes a display subsystem 830, which represents hardware components (e.g., display devices) and software components (e.g., drivers) that provide a visual and/or tactile display for a user to interact with computing device 800. Display subsystem 830 may include a display interface 832, which may be a particular screen or hardware device used to provide a display to a user. In one embodiment, display interface 832 includes logic separate from processor 810 to perform at least some processing related to the display. In some embodiments, display subsystem 830 includes a touch screen (or touch pad) device that provides both output and input to a user.

In some embodiments, computing device 800 includes an I/O controller 840 associated with hardware devices and software components related to interaction with a user. I/O controller 840 is operable to manage hardware that is part of audio subsystem 820 and/or display subsystem 830. Additionally, I/O controller 840 may be a connection point for additional devices that connect to computing device 800, through which a user might interact with the system. For example, devices that can be attached to computing device 800 might include microphone devices, speaker or stereo systems, video systems or other display devices, keyboard or keypad devices, or other I/O devices for use with specific applications such as card readers or other devices.

As mentioned above, I/O controller 840 can interact with audio subsystem 820 and/or display subsystem 830. For example, input through a microphone or other audio device can provide input or commands for one or more applications or functions of computing device 800. Additionally, audio output can be provided instead of, or in addition to, display output. In another example, if display subsystem 830 includes a touch screen, the display device may also act as an input device, which can be at least partially managed by I/O controller 840. There can also be additional buttons or switches on computing device 800 to provide I/O functions managed by I/O controller 840.

In some embodiments, I/O controller 840 manages devices such as accelerometers, cameras, light sensors or other environmental sensors, or other hardware that can be included in computing device 800. The input can be part of direct user interaction, and may provide environmental input to the system to influence its operations (such as filtering for noise, adjusting displays for brightness detection, applying a flash for a camera, or other features).

In some embodiments, computing device 800 includes a power management component 850 that manages battery power usage, charging of the battery, and features related to power saving operation.

A memory subsystem 860 includes memory devices for storing information in computing device 800. Memory subsystem 860 can include nonvolatile memory devices (whose state does not change if power to the memory device is interrupted) and/or volatile memory devices (whose state is indeterminate if power to the memory device is interrupted). Memory subsystem 860 can store application data, user data, music, photos, documents, or other data, as well as system data (whether long-term or temporary) related to the execution of the applications and functions of computing device 800.

Some portion of memory subsystem 860 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 800 includes a network interface within a connectivity component 870, such as a cellular interface 872 or a wireless interface 874, so that an embodiment of computing device 800 may be incorporated into a wireless device such as a cellular phone or a personal digital assistant. In some embodiments, connectivity component 870 includes hardware devices (e.g., wireless and/or wired connectors and communication hardware) and software components (e.g., drivers and/or protocol stacks) to enable computing device 800 to communicate with external devices. Computing device 800 could include separate devices, such as other computing devices, wireless access points or base stations, as well as peripherals such as headsets, printers, or other devices.

In some embodiments, connectivity component 870 can include multiple different types of network interfaces, such as one or more wireless interfaces for allowing processor 810 to communicate with another device. To generalize, computing device 800 is illustrated with cellular interface 872 and wireless interface 874. Cellular interface 872 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 874 refers generally to non-cellular wireless interfaces, and can include personal area networks (such as Bluetooth, Near Field, etc.), local area networks (such as Wi-Fi), and/or wide area networks (such as WiMax), or other wireless communication.

In some embodiments, computing device 800 has various peripheral connections 880, which may include hardware interfaces and connectors, as well as software components (e.g., drivers and/or protocol stacks) to make peripheral connections. It will be understood that computing device 800 could both be a peripheral device to other computing devices (via "to" 882), as well as have peripheral devices connected to it (via "from" 884). The computing device 800 may have a "docking" connector to connect to other computing devices for purposes such as managing content on computing device 800 (e.g., downloading and/or uploading, changing, synchronizing). Additionally, a docking connector can allow computing device 800 to connect to certain peripherals that allow computing device 800 to control content output, for example, to audiovisual or other systems.

In addition to a proprietary docking connector or other proprietary connection hardware, computing device 800 can make peripheral connections 880 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

In one example, an apparatus comprises a first circuitry, a second circuitry, and a datapath circuitry. The first circuitry comprises a first input/output (IO) interface. The second circuitry comprises a second input/output (IO) interface. The datapath circuitry is coupled to the first circuitry and the second circuitry. The second circuitry is to convert a transaction received on the second IO interface into a transaction for the first IO interface, and to convert a transaction received on the first IO interface into a transaction for the second IO interface. The first IO interface comprises a serial data bus which is operable at a first frequency, and the second IO interface comprises a serial data bus which is operable at a second frequency, the first frequency being greater than the second frequency.

In some embodiments, the second IO interface is an Inter Integrated Circuit (I2C) interface. In some embodiments, a third circuitry comprises a third input/output (IO) interface. The third circuitry is to convert a transaction received on the third IO interface into a transaction for the first IO interface, and to convert a transaction received on the first IO interface into a transaction for the third IO interface. In some embodiments, the third IO interface is one of: a Serial Peripheral Interface (SPI) bus, a UART (Universal Asynchronous Receiver/Transmitter) bus, and a debug bus. In some embodiments, the datapath circuitry is to forward a transaction received on the second IO interface to the first circuitry, and is to forward a transaction received on the third IO interface to the first circuitry. The datapath circuitry is to arbitrate between a transaction received on the second IO interface and a transaction received on the third IO interface. Some embodiments comprise an internal oscillator.

In some embodiments, the first IO interface is operable at a first high-voltage level, and the second IO interface is operable at a second high-voltage level greater than the first high-voltage level. In some embodiments, the second circuitry has a first part operable at the first frequency and at the first high-voltage level, and has a second part operable at the second frequency and at the second high-voltage level. The first part is driven by a first clock source and a first supply voltage, and the second part is driven by a second clock source separate from the first clock source and a second supply voltage separate from the first supply voltage. In some embodiments, the second circuitry is to write a first transaction received to a buffer at the first frequency, and is to retrieve the first transaction from the buffer at the second frequency. In such embodiments, the second circuitry is to write a second transaction received to a buffer at the second frequency, and is to retrieve the second transaction from the buffer at the first frequency.

In some embodiments, the second circuitry is to map one or more fields of a first transaction compliant with the first IO interface into one or more fields for a transaction compliant with the second IO interface. In such embodiments, the second circuitry is to map one or more fields of a second transaction compliant with the second IO interface into one or more fields for a transaction compliant with the first IO interface.

In another example, a system comprises a memory, a processor coupled to the memory, and a wireless interface for allowing the processor to communicate with another device, the system including any of the exemplary apparatus described above.

In another example, an apparatus comprises: a host-protocol transceiver coupled to a host-protocol input/output (IO) interface comprising a serial data bus; a first guest-protocol transceiver coupled to a first guest-protocol input/output (IO) interface comprising a serial data bus; and a second guest-protocol transceiver coupled to a second guest-protocol input/output (IO) interface, wherein the serial data bus of the host-protocol IO interface is operable at a first frequency, and the serial data bus of the first guest-protocol IO interface is operable at a second frequency, the first frequency being greater than the second frequency; and wherein the host-protocol IO interface is operable at a first high-voltage level, and the first guest-protocol IO interface is operable at a second high-voltage level, the second high-voltage level being greater than the first high-voltage level.

In some embodiments, the first guest-protocol IO interface is an Inter Integrated Circuit (I2C) interface. In some embodiments, the second guest-protocol IO interface is one of: a Serial Peripheral Interface (SPI) interface, a Universal Asynchronous Receiver/Transmitter (UART) interface, and a Debug Bus interface. In some embodiments, the apparatus comprises: a first guest-protocol conversion circuitry to convert a transaction received by the first guest-protocol transceiver into a first converted transaction for the host-protocol transceiver, and to convert a transaction received by the host-protocol transceiver into a transaction for the first guest-protocol transceiver; and a second guest-protocol conversion circuitry to convert a transaction received by the second guest-protocol transceiver into a second converted transaction for the host-protocol transceiver, and to convert a transaction received by the host-protocol transceiver into a transaction for the second guest-protocol transceiver.

In some embodiments, the apparatus comprises: a first datapath circuitry to forward the first converted transaction for the host-protocol transceiver to the host-protocol transceiver; and a second datapath circuitry to forward the second converted transaction for the host-protocol transceiver to the host-protocol transceiver. In some embodiments, the apparatus comprises: a bus selection circuitry to select between the first datapath circuitry and the second datapath circuitry based upon an assigned priority of the first guest-protocol IO interface and an assigned priority of the second guest-protocol IO interface.

In some embodiments, the apparatus comprises: a first guest-protocol conversion circuitry to convert a transaction received by the first guest-protocol transceiver into a transaction for the host-protocol transceiver, and to convert a transaction received by the host-protocol transceiver into a transaction for the first guest-protocol transceiver, wherein the first guest-protocol conversion circuitry has a first part operable at the first frequency and at the first high-voltage level, and has a second part operable at the second frequency and at the second high-voltage level; and wherein the first part is driven by a first clock source and a first supply voltage, and the second part is driven by a second clock source separate from the first clock source and a second supply voltage separate from the first supply voltage.

In some embodiments, the host-protocol IO interface comprises a serial clock line and a serial data line. In some embodiments, the first guest-protocol conversion circuitry is to buffer a first transaction received at the first frequency, and is to retrieve the first transaction at the second frequency; and the first guest-protocol conversion circuitry is to buffer a second transaction received at the second frequency, and is to receive the second transaction at the second frequency.

In some embodiments, the first guest-protocol conversion circuitry is to map one or more fields of a first transaction compliant with the host-protocol IO interface into one or more fields for a transaction compliant with the first guest-protocol IO interface; and the first guest-protocol conversion circuitry is to map one or more fields of a second transaction compliant with the first guest-protocol IO interface into one or more fields for a transaction compliant with the host-protocol IO interface.

In another example, a system comprises a memory, a processor coupled to the memory, and a wireless interface for allowing the processor to communicate with another device, the system including any of the exemplary apparatus described above.

In another example, a system comprises a memory, a processor coupled to the memory, and a wireless interface for allowing the processor to communicate with another device, the processor and a repeater including: a first circuitry comprising a first input/output (IO) interface; a second circuitry comprising a second input/output (IO) interface; and a datapath circuitry coupled to the first circuitry and the second circuitry, wherein the second circuitry is to convert a transaction received on the second IO interface into a transaction for the first IO interface, and to convert a transaction received on the first IO interface into a transaction for the second IO interface; and wherein the first IO interface comprises a serial data bus which is operable at a first frequency, and the second IO interface comprises a serial data bus which is operable at a second frequency, the first frequency being greater than the second frequency.

In some embodiments, the apparatus comprises: a third circuitry comprising a third input/output (IO) interface, wherein the third circuitry is to convert a transaction received on the third IO interface into a transaction for the first IO interface, and to convert a transaction received on the first IO interface into a transaction for the third IO interface. In some embodiments, the datapath circuitry is to forward a transaction received on the second IO interface to the first circuitry, and is to forward a transaction received on the third IO interface to the first circuitry; and the datapath circuitry is to arbitrate between a transaction received on the second IO interface and a transaction received on the third IO interface.

In another example, a method comprises: converting a first transaction received on a host-protocol input/output (IO) interface into a transaction for a guest-protocol input/output (IO) interface; and converting a second transaction received on a guest-protocol IO interface into a transaction for the host-protocol IO interface, wherein the host-protocol IO interface comprises a serial data bus which is operable at a first frequency, and the guest-protocol IO interface comprises a serial data bus which is operable at a second frequency, the first frequency being greater than the second frequency.

In some embodiments, the method comprises: converting a third transaction received on the host-protocol IO interface into a transaction for an additional guest-protocol IO interface; and converting a fourth transaction received on an additional guest-protocol IO interface into a transaction for the host-protocol IO interface, wherein the guest-protocol IO interface is an Inter Integrated Circuit (I2C) interface; and wherein the additional guest-protocol IO interface is one of: a Serial Peripheral Interface (SPI) bus, a UART (Universal Asynchronous Receiver/Transmitter) bus, and a debug bus.

In some embodiments, the method comprises: arbitrating between the second transaction and the fourth transaction. In some embodiments, the arbitrating is one of: round-robin arbitrating, and weighted round-robin arbitrating. In some embodiments, the method comprises: isolating the host-protocol IO interface electrically from the guest-protocol IO interface.

In some embodiments, the serial data bus of the host-protocol IO interface is operable at a first high-voltage level, and the serial data bus of the guest-protocol IO interface is operable at a second high-voltage level, the second high-voltage level being greater than the first high-voltage level; wherein the first frequency is driven by a first clock source, and the first high-voltage level is driven by a first supply voltage; and wherein the second frequency is driven by a second clock source separate from the first clock source, and the second high-voltage level is driven by a second supply voltage separate from the first supply voltage.

In another example, machine readable storage medium has machine executable instructions stored thereon that, when executed, cause one or more processors to perform any of the exemplary methods described above.

In another example, machine readable storage medium having machine executable instructions stored thereon that, when executed, cause one or more processors to perform an operation comprises: convert a first transaction received on a host-protocol input/output (IO) interface into a transaction for a guest-protocol input/output (IO) interface; and convert a second transaction received on a guest-protocol IO interface into a transaction for the host-protocol IO interface, wherein the host-protocol IO interface comprises a serial data bus which is operable at a first frequency, and the guest-protocol IO interface comprises a serial data bus which is operable at a second frequency, the first frequency being greater than the second frequency.

In some embodiments, the operation further comprises: convert a third transaction received on the host-protocol IO interface into a transaction for an additional guest-protocol IO interface; and convert a fourth transaction received on an additional guest-protocol IO interface into a transaction for the host-protocol IO interface, wherein the guest-protocol IO interface is an Inter Integrated Circuit (I2C) interface; and wherein the additional guest-protocol IO interface is one of: a Serial Peripheral Interface (SPI) bus, a UART (Universal Asynchronous Receiver/Transmitter) bus, and a debug bus.

In some embodiments, the operation further comprises: arbitrate between the second transaction and the fourth transaction. In some embodiments, the arbitration is one of: round-robin arbitration, and weighted round-robin arbitration.

In some embodiments, the serial data bus of the host-protocol IO interface is operable at a first high-voltage level, and the serial data bus of the guest-protocol IO interface is operable at a second high-voltage level, the second high-voltage level being greater than the first high-voltage level; wherein the first frequency is driven by a first clock source, and the first high-voltage level is driven by a first supply voltage; and wherein the second frequency is driven by a second clock source separate from the first clock source, and the second high-voltage level is driven by a second supply voltage separate from the first supply voltage.

In some embodiments, the operation further comprises: isolate the host-protocol IO interface electrically from the guest-protocol IO interface. In another example, an apparatus comprises: means for converting a first transaction received on a host-protocol input/output (IO) interface into a transaction for a guest-protocol input/output (IO) interface; and means for converting a second transaction received on a guest-protocol IO interface into a transaction for the host-protocol IO interface, wherein the host-protocol IO interface comprises a serial data bus which is operable at a first frequency, and the guest-protocol IO interface comprises a serial data bus which is operable at a second frequency, the first frequency being greater than the second frequency.

In some embodiments, the apparatus comprises: means for converting a third transaction received on the host-protocol IO interface into a transaction for an additional guest-protocol IO interface; and means for converting a fourth transaction received on an additional guest-protocol IO interface into a transaction for the host-protocol IO interface, wherein the guest-protocol IO interface is an Inter Integrated Circuit (I2C) interface; and wherein the additional guest-protocol IO interface is one of: a Serial Peripheral Interface (SPI) bus, a UART (Universal Asynchronous Receiver/Transmitter) bus, and a debug bus.

In some embodiments, the apparatus comprises: means for arbitrating between the second transaction and the fourth transaction. In some embodiments, the arbitration is one of: round-robin arbitration, and weighted round-robin arbitration. In some embodiments, the apparatus comprises: isolating the host-protocol IO interface electrically from the guest-protocol IO interface.

In some embodiments, the serial data bus of the host-protocol IO interface is operable at a first high-voltage level, and the serial data bus of the guest-protocol IO interface is operable at a second high-voltage level, the second high-voltage level being greater than the first high-voltage level; the first frequency is driven by a first clock source, and the first high-voltage level is driven by a first supply voltage; and the second frequency is driven by a second clock source separate from the first clock source, and the second high-voltage level is driven by a second supply voltage separate from the first supply voltage.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

I claim:

1. An apparatus comprising:
a first circuitry comprising a first input/output (IO) interface;
a second circuitry comprising a second IO interface;
a third circuitry to convert a transaction received on the second IO interface into a transaction for the first IO interface, and to convert a transaction received on the first IO interface into a transaction for the second IO interface; and
a Bus Characteristics Register (BCR) to store at least 8 bits,
wherein the first IO interface comprises an Improved Inter Integrated Circuit (I3C) interface which is operable at a first frequency;
wherein the second IO interface is operable at a second frequency less than the first frequency, the second IO interface comprising: an Inter Integrated Circuit (I2C) interface, a Serial Peripheral Interface (SPI) interface, or a UART (Universal Asynchronous Receiver/Transmitter); and
wherein the BCR includes a device role field having at least a first value indicating that the apparatus comprises an I3C slave, and a second value indicating that the apparatus comprises an I3C master.

2. The apparatus of claim 1,
wherein the BCR includes a bridge identifier field having at least a first value indicating that the apparatus comprises an I3C bridge device, and a second value indicating that the apparatus does not comprise an I3C bridge device.

3. The apparatus of claim 1,
wherein the BCR includes an offline capable field having at least a first value indicating that the apparatus will always respond to I3C bus commands, and a second value indicating that the apparatus will not always respond to I3C bus commands.

4. The apparatus of claim 1, comprising:
a Legacy Register (LVR) that includes an I2C mode indicator field having at least a first value indicating that the I2C interface supports Fast-mode (Fm), and a second value indicating that the I2C interface supports Fast-mode plus (Fm+).

5. The apparatus of claim 1,
wherein the first IO interface is to process a Set Bridge Targets (SETBRGTGT) I3C command code carrying information regarding one or more endpoints the apparatus is communicating with, the information comprising at least: a dynamic address indicator, or a type/ID indicator.

6. The apparatus of claim 1,
wherein the third circuitry is to write the transaction received on the second IO interface into a first buffer at the second frequency, and is to retrieve the transaction received on the second IO interface from the first buffer at the first frequency; and
wherein the third circuitry is to write the transaction received on the first IO interface into a second buffer at the first frequency, and is to retrieve the transaction received on the first IO interface from the second buffer at the second frequency.

7. An apparatus comprising:
a first transceiver coupled to a first input/output (IO) interface comprising a serial data bus;
a second transceiver coupled to a second IO interface comprising a serial data bus;
a third transceiver coupled to a third IO interface; and
a Bus Characteristics Register (BCR) to store at least 8 bits,
wherein the serial data bus of the first IO interface is an Improved Inter Integrated Circuit (I3C) interface which is operable at a first frequency;
wherein the serial data bus of the second IO interface is an Inter Integrated Circuit (I2C) interface which is operable at a second frequency less than the first frequency;
wherein the third IO interface comprises: a Serial Peripheral Interface (SPI) interface, or a Universal Asynchronous Receiver/Transmitter (UART); and
wherein the BCR includes a bridge identifier field having at least a first value indicating that the apparatus comprises an I3C bridge device, and a second value indicating that the apparatus does not comprise an I3C bridge device.

8. The apparatus of claim 7,
wherein the BCR includes a device role field having at least a first value indicating that the apparatus comprises an I3C slave, and a second value indicating that the apparatus comprises an I3C master.

9. The apparatus of claim 7,
wherein the BCR includes an offline capable field having at least a first value indicating that the apparatus will always respond to I3C bus commands, and a second value indicating that the apparatus will not always respond to I3C bus commands.

10. The apparatus of claim 7, comprising:
a Legacy Register (LVR) that includes an I2C mode indicator field having at least a first value indicating that the I2C interface supports Fast-mode (Fm), and a second value indicating that the I2C interface supports Fast-mode plus (Fm+).

11. The apparatus of claim 7,
wherein the first IO interface is to process a Set Bridge Targets (SETBRGTGT) I3C command code carrying information regarding one or more endpoints the apparatus is communicating with, the information comprising at least: a dynamic address indicator, or a type/ID indicator.

12. The apparatus of claim 7, comprising:
a circuitry to convert a transaction received on the second IO interface into a transaction for the first IO interface, and to convert a transaction received on the first IO interface into a transaction for the second IO interface,
wherein the third circuitry is to write the transaction received on the second IO interface into a first buffer at the second frequency, and is to retrieve the transaction received on the second IO interface from the first buffer at the first frequency; and wherein the third circuitry is to write the transaction received on the first IO interface into a second buffer at the first frequency, and is to retrieve the transaction received on the first IO interface from the second buffer at the second frequency.

13. A system comprising a memory, a processor coupled to the memory, and a wireless interface to allow the processor to communicate with another device, the processor and an apparatus including:

a first circuitry comprising a first input/output (IO) interface;

a second circuitry comprising a second IO interface;

a third circuitry to convert a transaction received on the second IO interface into a transaction for the first IO interface, and to convert a transaction received on the first IO interface into a transaction for the second IO interface; and a Bus Characteristics Register (BCR) to store at least 8 bits, wherein the first IO interface comprises an Improved Inter Integrated Circuit (I3C) interface which is operable at a first frequency;

wherein the second IO interface is operable at a second frequency less than the first frequency, the second IO interface comprising: an Inter Integrated Circuit (I2C) interface, a Serial Peripheral Interface (SPI) interface, or a UART (Universal Asynchronous Receiver/Transmitter); and wherein the BCR includes an offline capable field having at least a first value indicating that the apparatus will always respond to I3C bus commands, and a second value indicating that the apparatus will not always respond to I3C bus commands.

14. The system of claim 13, wherein the BCR includes a device role field having at least a first value indicating that the apparatus comprises an I3C slave, and a second value indicating that the apparatus comprises an I3C master.

15. The system of claim 13, wherein the BCR includes a bridge identifier field having at least a first value indicating that the apparatus comprises an I3C bridge device, and a second value indicating that the apparatus does not comprise an I3C bridge device.

16. The system of claim 13, comprising:

a Legacy Register (LVR) that includes an I2C mode indicator field having at least a first value indicating that the I2C interface supports Fast-mode (Fm), and a second value indicating that the I2C interface supports Fast-mode plus (Fm+).

17. The system of claim 13, wherein the first IO interface is to process a Set Bridge Targets (SETBRGTGT) I3C command code carrying information regarding one or more endpoints the apparatus is communicating with, the information comprising at least: a dynamic address indicator, or a type/ID indicator.

18. A method comprising:

receiving a transaction on a first input/output (IO) interface;

receiving a transaction on a second IO interface;

converting the transaction received on the first IO interface into a transaction for the second IO interface; and converting the transaction received on the second IO interface into a transaction for the first IO interface, wherein the first IO interface comprises an Improved Inter Integrated Circuit (I3C) interface which is operable at a first frequency, and which comprises a Bus Characteristics Register (BCR) to store at least 8 bits;

wherein the second IO interface is operable at a second frequency less than the first frequency, the second IO interface comprising: an Inter Integrated Circuit (I2C) interface, a Serial Peripheral Interface (SPI) interface, or a UART (Universal Asynchronous Receiver/Transmitter); and wherein the first IO interface is to process a Set Bridge Targets (SETBRGTGT) I3C command code carrying information regarding one or more endpoints the apparatus is communicating with, the information comprising at least: a dynamic address indicator, or a type/ID indicator.

19. The method of claim 18, wherein the BCR includes a device role field having at least a first value indicating that the apparatus comprises an I3C slave, and a second value indicating that the apparatus comprises an I3C master.

20. The method of claim 18, wherein the BCR includes a bridge identifier field having at least a first value indicating that the apparatus comprises an I3C bridge device, and a second value indicating that the apparatus does not comprise an I3C bridge device.

21. The method of claim 18, wherein the BCR includes an offline capable field having at least a first value indicating that the apparatus will always respond to I3C bus commands, and a second value indicating that the apparatus will not always respond to I3C bus commands.

22. The method of claim 18, comprising:

a Legacy Register (LVR) that includes an I2C mode indicator field having at least a first value indicating that the I2C interface supports Fast-mode (Fm), and a second value indicating that the I2C interface supports Fast-mode plus (Fm+).

* * * * *